3,014,011
PROCESS FOR DRYING POLYESTER CHIPS
Gijsbertus Johannes Zoetbrood, Velp, Netherlands, assignor, by mesne assignments, to N.V. Onderzoekingsinstituut Research, Arnhem, Netherlands, a corporation of the Netherlands
No Drawing. Filed Feb. 3, 1958, Ser. No. 712,627
Claims priority, application Netherlands Feb. 20, 1957
6 Claims. (Cl. 260—75)

This invention relates to drying chips or granules of amorphous polymers and more particularly to drying granules of amorphous polymeric linear polyesters.

By highly polymeric linear polyesters is meant polyesters that have fiber-forming properties and, thus, are capable of molecular orientation. The polyesters are those obtained by the polycondensation of glycols of the series $HO(CH_2)_nOH$ where $n$ is a whole number from 2 to 10 and terephthalic acid or an ester-forming derivative thereof. Ester-forming derivatives of terephthalic acid may include aliphatic (including cycloaliphatic) andaryl esters and half-esters, acids, halides, ammonium and amine salts, and other forms. Of the said polyesters, polyethylene terephthalate is preferred because of its present commercial availability.

Ordinarily, after polyethylene terephthalate is polymerized, it is initially extruded into shaped objects of ribbons, filaments, and the like, which are rapidly quenched from the molten state, usually by water. The shaped objects which are almost totally amorphous are comminuted into a desired particle size since continuous filaments and yarns of polyethylene terephthalate may best be prepared by the grid spinning method which includes melting the polymer in the form of granules, chips, or the like on a heated grid, forcing the melt through a spinneret and cooling the filaments so formed. The comminuted particles must be intensively dried before melt spinning if hydrolysis of the polyester is to be avoided.

Heretofore, the drying was best effected by heating the polyester granules at an elevated temperature below its melting point, preferably under a reduced pressure, while vigorously tumbling the granules in a tumbling device, such as a rolling drum, and passing a hot inert gas over the granules. This vigorous tumbling was required in order to prevent the granular particles from sticking together and could only be carried out with the tumbling device being only partially filled. Obviously, in such a drying operation, the energy consumption is high; and the drying equipment must necessarily be uneconomical because it is complicated and large in relation to its potential drying capacity.

It is an object of the present invention to provide a new and improved method of drying granules of polyesters which is considerably less expensive.

It is another object to provide such a method which can be practiced without vigorous agitation of the granules during the drying.

It is a further object to provide a method whereby granules of polyesters may be more efficiently dried than by the methods of the prior art.

Other objects and advantages of the present invention will become apparent from the following detailed description.

The improved results are realized by first subjecting a substantially amorphous synthetic linear polyester to conditions such that the crystallinity of said polyester is increased to a required minimum extent to appreciably reduce or to eliminate the tendency of the granules of the polyester to stick together at an elevated temperature, drying said granules and thereafter melt spinning the same. By increasing the crystallinity, the granules may be dried at an elevated temperature while maintaining at most only a slight movement between the granules.

It has been found in practice that the polyester may be fully crystallized before drying the granules but that a minimum partial crystallization of the polymer will also prevent the sticking of the granules to each other during the drying operation.

The partial or total crystallization of the polyester may be accomplished in various manners, by continuous or discontinuous processes, either before or after the initially extruded polymer is reduced to granular form.

A convenient method of inducing crystallization in the polyester is to subject it to the action of a swelling agent at elevated temperatures. It will be appreciated that the minimum temperature at which the crystallization is carried out is dependent upon the nature of the swelling agent and that the temperature selected is further dependent upon the rate at which the crystallization is chosen to take place.

Among the swelling agents which promote the crystallization are such substances as acetone, nitromethane, hot water, saturated steam, toluene, benzene, chlorinated hydrocarbons, lower alcohols, and other agents. However, hot water and saturated steam are cheaper and therefore the preferred swelling agents.

When using swelling agents, the crystallization of the polyester granules may be carried out in a separate device; but for economical reasons it is preferred to induce crystallization and to dry in the same device. For example, in the present method the amorphous polyester granules may be allowed to move downwardly through a vertically mounted cylinder with the granules being continuously supplied at a point near the top of the cylinder and with the granules being continuously withdrawn from the bottom of the cylinder. In such an arrangement hot air, for example, is directed upwardly from the bottom of the cylinder to dry the granules. From the upper part of the cylinder, saturated steam or other suitable swelling agent is directed upwardly through the cylinder to induce crystallization in the polymer particles.

In another continuous crystallization and drying process, the polyester granules may be directed onto a moving perforated conveying belt which carries the granules through a zone wherein a swelling agent is supplied to the granules and thence to a second zone wherein the granules are dried.

In a somewhat similar manner the polyester granules may be continuously crystallized and dried by utilizing a screw conveyor provided with a housing. In such device, a hot gas, for example air, is blown through the housing in a direction countercurrent to the movement of the granules. During the first part of their travel through the housing the granules are treated with a swelling agent.

Furthermore, the crystallization may be effected continuously with the granules being carried by a moving conveying belt or a screw conveyor and thereafter, the drying carried out continuously by passing the granules vertically downwardly through a cylinder into which drying air is supplied upwardly.

In another arrangement, the crystallization may be effected in an inclined rotating cylinder wherein the polyester particles are tumbled with the agent in a gaseous form at an elevated temperature being passed in a countercurrent direction with respect to the forward movement of the particles. The particles may be dried in a manner described above, for example in a vertically mounted cylinder.

Since the specific gravity of a polyester increases with an increase in crystallinity, the degree of crystallinity may be easily ascertained by determining the change in specific gravity resulting from the increased crystallinity. It has been found that when amorphous polyethylene terephthalate having a specific gravity of 1.32 is crystallized to the extent that the specific gravity thereof is increased to at least 1.34, sufficient crystallinity has been induced to prevent sticking of the granules in a subsequent drying process conducted at elevated temperatures and in which movement of the granules relative to each other is kept at a minimum.

In practice, such a degree of crystallinity is attained by a treatment of polyethylene terephthalate granules for 5 to 10 minutes with water at 80 to 100° C. Also, a suitable crystallization of the granules is attained by a treatment with steam at 100° C. for 15 to 25 minutes. Further, when acetone or nitromethane is used as a swelling agent, a sufficient crystallization of the polyester particles is attained after a treatment at room temperatures of 60 and 10 minutes, respectively.

While the process has been described, particularly with reference to drying with heated air, it will be appreciated that the drying may also be accomplished under reduced pressure at elevated temperatures.

It will be understood that the following examples are merely illustrative and not limitative.

EXAMPLE I

Granules of amorphous polyethylene terephthalate having average dimensions of 4 x 4 x 2 mm. were treated for various durations as indicated below in Table I in an open vessel containing water at 100° C. During the treatment there was no movement between the granules. Thereafter, the thus treated granules were dried for one hour at 160° C. with no movement between the granules taking place. The percentages of sticking granules and the specific gravities were determined both before and after the drying operation. The table below shows these results.

*Table I*

| Sample | 1 | 2 | 3 |
|---|---|---|---|
| Duration of Treatment, Min | 5 | 10 | 15 |
| Before Drying: | | | |
| Sticking Granules, percent | 0.0 | 0.0 | 0.0 |
| Sp. Gr | 1.340 | 1.346 | 1.351 |
| After Drying: | | | |
| Sticking Granules, percent | 0.0 | 0.0 | 0.0 |
| Sp. Gr | 1.370 | 1.370 | 1.370 |

EXAMPLE II

Granules of amorphous polyethylene terephthalate having average dimensions of 4 x 4 x 2 mm. were treated for various durations as indicated below in Table II with saturated steam at 100° C. During the treatment there was no movement between the granules. Thereafter, the thus treated granules were dried for one hour at 160° C. with no movement between the granules taking place. The percentages of sticking granules and the specific gravities were determined both before and after the drying operation. The table below shows that when the crystallinity of the polyester was increased to the point where its specific gravity had increased to at least 1.34, no sticking of the granules occurred; whereas, if the specific gravity was below 1.34, some sticking did occur.

*Table II*

| Sample | 1 | 2 | 3 | 4 |
|---|---|---|---|---|
| Duration of Treatment, Min | 10 | 15 | 20 | 25 |
| Before Drying: | | | | |
| Sticking Granules, percent | 5.0 | 0.0 | 0.0 | 0.0 |
| Sp. Gr | 1.335 | 1.342 | 1.347 | 1.350 |
| After Drying: | | | | |
| Sticking Granules, percent | 6.0 | 0.0 | 0.0 | 0.0 |
| Sp. Gr | 1.370 | 1.370 | 1.370 | 1.370 |

EXAMPLE III

Granules of amorphous polyethylene terephthalate having average dimensions of 4 x 4 x 2 mm. were treated for various durations as indicated below in Table III with toluene vapor at 110° C. During the treatment there was no movement between the granules. Thereafter, the thus treated granules were dried for one hour at 160° C. with no movement between the granules taking place. The percentages of sticking granules and the specific gravities were determined both before and after the drying operation. The table below shows these results.

*Table III*

| Sample | 1 | 2 | 3 |
|---|---|---|---|
| Duration of Treatment, Min | 15 | 30 | 60 |
| Before Drying: | | | |
| Sticking Granules, percent | 0.0 | 0.0 | 0.0 |
| Sp. Gr | 1.356 | 1.361 | 1.362 |
| After Drying: | | | |
| Sticking Granules, percent | 0.0 | 0.0 | 0.0 |
| Sp. Gr | 1.375 | 1.375 | 1.375 |

EXAMPLE IV

Granules of amorphous polyethylene terephthalate having average dimensions of 4 x 4 x 2 mm. were treated for various durations as indicated below in Table IV with acetone vapor at 56° C. During the treatment there was no movement between the granules. Thereafter, the thus treated granules were dried for one hour at 160° C. with no movement between the granules taking place. The percentages of sticking granules and the specific gravities were determined both before and after the drying operation. The table below shows these results.

*Table IV*

| Sample | 1 | 2 | 3 |
|---|---|---|---|
| Duration of Treatment, Min | 5 | 10 | 15 |
| Before Drying: | | | |
| Sticking Granules, percent | 0.0 | 0.0 | 0.0 |
| Sp. Gr | 1.354 | 1.359 | 1.360 |
| After Drying: | | | |
| Sticking Granules, percent | 0.0 | 0.0 | 0.0 |
| Sp. Gr | 1.375 | 1.375 | 1.375 |

EXAMPLE V

A vertically mounted cylinder with a diameter of 40 cm. and a length of 450 cm. was filled to a height of 375 cm. with granules of 4 x 4 x 2 mm. of crystallized polyethylene terephthalate. Air at 170° C. was supplied to the bottom of the cylinder and blown upwardly through the cylinder. Saturated steam at 100° C. was supplied at a point 150 cm. from the top of the cylinder and directed upwardly through the cylinder. The air and the steam were discharged at the top of the cylinder. Granules of amorphous polyethylene terephthalate having average dimensions of 4 x 4 x 2 mm. and a specific gravity of 1.32 and containing 0.5% moisture were continuously fed into the top cylinder at a rate of 150 kg. per hour with the granules being withdrawn from the bottom of the cylinder at the same rate.

The time during which the granules were subjected to the action of the steam was 25 minutes while the time during which the granules remained in the drying zone was 2 hours. The moisture content and the specific gravity of the granules were 0.008% by weight and 1.38, respectively. By this procedure, the polyester granules were continuously dried and moved through the cylinder while avoiding any sticking together of the granules. On the other hand when the steam supply is cut off, sticking of the granules occurred during the drying process to such an extent that practical application of the process becomes impossible.

As many widely different embodiments of this invention may be made without departing from the spirit and scope

What is claimed is:

1. A method of drying amorphous polyethylene terephthalate granules which comprises treating the amorphous polyethylene terephthalate granules for from 5 to 60 minutes at a temperature from room temperature to about 110° C. with a swelling agent for the polyethylene terephthalate, selected from the group consisting of water, saturated steam, toluene, benzene, nitromethane and acetone, to effect at least a partial crystallization of the granules and an increase of the specific gravity of the granules to at least 1.34, whereby sticking together of the granules during subsequent drying is inhibited and finally drying the granules at a temperature of about 160° C. to 170° C. and, during said drying, holding movement of the granules to a minimum.

2. A method of drying amorphous polyethylene terephthalate granules which comprises treating the amorphous polyethylene terephthalate granules for from 5 to 60 minutes at a temperature from about 56° C. to about 110° C. with a swelling agent for the polyethylene terephthalate, selected from the group consisting of water, saturated steam, toluene, benzene, nitromethane and acetone, to effect at least a partial crystallization of the granules and an increase of the specific gravity of the granules to at least 1.34, whereby sticking together of the granules during subsequent drying is inhibited and finally drying the granules at a temperature of about 160° C. and, during said drying, holding movement between the granules to a minimum.

3. A method of drying amorphous polyethylene terephthalate granules which comprises effecting at least a partial crystallization of the granules and increasing the specific gravity of the granules to 1.34 by treating the same with water for 5 to 10 minutes at 80° C. to 100° C. whereby sticking together of the granules during subsequent drying is inhibited and finally drying the granules at a temperature of about 160° C. and, during said drying, holding movement between the granules to a minimum.

4. A method of drying amorphous polyethylene terephthalate granules which comprises effecting at least a partial crystallization of the granules and increasing the specific gravity of the granules to 1.34 by treating the same with saturated steam for 15 to 25 minutes at about 100° C. whereby sticking together of the granules during subsequent drying is inhibited and finally drying the granules at a temperature of about 160° C. and, during said drying, holding movement between the granules to a minimum.

5. The process as defined in claim 2 wherein the swelling agent is vapor of toluene and the treatment of the granules with the swelling agent is effected at a temperature of 110° C.

6. The process as defined in claim 2 wherein the swelling agent is vapor of acetone and the treatment of the granules with the swelling agent is effected at a temperature of 56° C.

References Cited in the file of this patent

UNITED STATES PATENTS

| | | |
|---|---|---|
| 2,491,350 | Young | Dec. 13, 1949 |
| 2,595,679 | Lew | May 6, 1952 |
| 2,706,722 | Caldwell | Apr. 19, 1955 |
| 2,762,788 | Siggel | Sept. 11, 1956 |